(12) United States Patent
Nakamura et al.

(10) Patent No.: US 12,736,139 B2
(45) Date of Patent: Sep. 15, 2026

(54) VALVE DEVICE

(71) Applicant: FUJIKIN INCORPORATED, Osaka (JP)

(72) Inventors: Nobuo Nakamura, Osaka (JP); Tomohiro Nakata, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 247 days.

(21) Appl. No.: 17/905,692

(22) PCT Filed: Feb. 18, 2021

(86) PCT No.: PCT/JP2021/006213
§ 371 (c)(1),
(2) Date: Sep. 6, 2022

(87) PCT Pub. No.: WO2021/192753
PCT Pub. Date: Sep. 30, 2021

(65) Prior Publication Data

US 2023/0175598 A1 Jun. 8, 2023

(30) Foreign Application Priority Data

Mar. 26, 2020 (JP) ................................ 2020-055686
Mar. 26, 2020 (JP) ................................ 2020-055687

(51) Int. Cl.
*F16K 7/12* (2006.01)
*F16K 1/46* (2006.01)
(Continued)

(52) U.S. Cl.
CPC .................. *F16K 7/12* (2013.01); *F16K 1/46* (2013.01); *F16K 7/17* (2013.01); *F16K 25/005* (2013.01); *F16K 27/0236* (2013.01)

(58) Field of Classification Search
CPC . F16K 7/12; F16K 1/46; F16K 25/005; F16K 7/17; F16K 27/0236
See application file for complete search history.

(56) References Cited

U.S. PATENT DOCUMENTS 4,828,219 A * 5/1989 Ohmi ........................ F16K 7/14 251/118
4,867,201 A * 9/1989 Carten ...................... F17D 5/04 137/594
(Continued)

FOREIGN PATENT DOCUMENTS

JP H06193747 A 7/1994
JP 2015036563 A 2/2015
(Continued)

OTHER PUBLICATIONS

International Search Report and Written Opinion in corresponding International Application No. PCT/JP2021/006213 dated Apr. 20, 2021.
(Continued)

*Primary Examiner* — Craig M Schneider
*Assistant Examiner* — Christopher D Ballman
(74) *Attorney, Agent, or Firm* — Westman, Champlin & Kochler, P.A.

(57) ABSTRACT

A valve device includes a body that includes flow paths, a recessed portion, and a valve chamber; an inner disk that includes an inner peripheral edge portion and an outer peripheral edge portion; a diaphragm; a first annular surface that is formed at the inner peripheral edge portion on a side facing the valve chamber; a second annular surface that is formed at the inner peripheral edge portion on a side opposite to the first annular surface and is supported by a bottom surface of the recessed portion; a first sealing portion, which is held by the first annular surface, on and from which the diaphragm is seated and separated; and a second
(Continued)

sealing portion that is disposed between the second annular surface and the bottom surface of the recessed portion.

13 Claims, 7 Drawing Sheets

(51) Int. Cl.
*F16K 7/17* (2006.01)
*F16K 25/00* (2006.01)
*F16K 27/02* (2006.01)

(56) References Cited

U.S. PATENT DOCUMENTS 5,108,069 A * 4/1992 Tada .................... F16K 31/163 251/297
5,159,952 A * 11/1992 Ono .................. G05D 16/0655 251/368
5,215,286 A * 6/1993 Kolenc .................... F16K 7/12 92/130 A
5,335,691 A * 8/1994 Kolenc .................. F16K 41/12 251/331
5,340,170 A * 8/1994 Shinohara ........... F16L 27/0832 285/379
5,485,984 A * 1/1996 Itoi .......................... F16K 7/16 251/363
5,524,865 A * 6/1996 Uchisawa ................ F16K 7/14 251/359
6,073,646 A * 6/2000 Kimura .................. F16K 51/02 137/884
6,105,933 A * 8/2000 Kanno ..................... F16K 7/16 251/117
6,213,448 B1 * 4/2001 Hayakawa ............... F16K 1/36 251/356
6,786,471 B2 * 9/2004 Nakata ..................... F16K 7/16 251/360
6,871,803 B1 * 3/2005 Ohmi ........................ F16K 7/16 239/596
6,997,440 B2 * 2/2006 Tutt ......................... F16K 7/14 251/331
7,175,157 B2 * 2/2007 Tanikawa ................. F16K 7/14 251/331
7,416,165 B2 * 8/2008 Ohmi ..................... F16K 51/02 251/368
8,245,727 B2 * 8/2012 Mooney ............... G05D 16/163 138/40
8,251,347 B2 * 8/2012 Schmit ..................... F16K 7/16 251/335.2
8,960,644 B2 * 2/2015 Aoyama ................ F16K 1/425 251/333
9,285,042 B2 * 3/2016 Kitano ...................... F16K 7/14
9,863,542 B2 * 1/2018 Glime .................... C02F 1/325
11,306,830 B2 * 4/2022 Kondo ................. F16K 25/005
11,365,830 B2 * 6/2022 Watanabe ........... F16K 27/0236
11,506,295 B2 * 11/2022 Sato ..................... F16K 27/003
2003/0042459 A1 * 3/2003 Gregoire ............. F16K 27/0236 251/331
2014/0326915 A1 11/2014 Kitano et al.
2015/0008353 A1 1/2015 Kiku
2016/0178072 A1 6/2016 Kitano et al.
2019/0178394 A1 6/2019 Horiguchi
2021/0332900 A1 10/2021 Sato et al.

FOREIGN PATENT DOCUMENTS

TW 201925655 A 7/2019
WO 2013084744 A1 6/2013
WO 2019193978 A1 10/2019

OTHER PUBLICATIONS

Office Action in corresponding Taiwan Patent Application No. 110108404 dated May 5, 2022.

* cited by examiner

VALVE DEVICE

CROSS REFERENCE TO RELATED APPLICATION(S)

This Application is a Section 371 National Stage Application of International Application No. PCT/JP2021/006213, filed Feb. 18, 2021 and published as WO 2021/192753 A1 on Sep. 30, 2021, and further claims priority to Japanese Patent Application Ser. No. 2020-055686, filed Mar. 26, 2020 and Japanese Patent Application Ser. No. 2020-055687, filed Mar. 26, 2020.

TECHNICAL FIELD

The present invention relates to a valve device and specifically a valve device including a diaphragm in a valve body.

BACKGROUND ART

Patent Document 1 discloses a diaphragm valve including: a body that has an inlet flow path and an outlet flow path of a fluid and a recessed portion of an upper opening; a valve seat that is detachably disposed at a peripheral edge of a flow path formed in the body; a seat holder (also referred to as an inner disk) that is detachably disposed in the body and holds the valve seat; and a diaphragm that blocks or establishes communication of the flow path by abutting on and separating from the valve seat.

PRIOR ART DOCUMENT

Patent Document

Patent Document 1: Japanese Patent Laid-Open No. 2015-36563

SUMMARY OF THE INVENTION

Problems to be Solved

The valve seat described in Patent Document 1 is an annular valve seat body which is attached to an inner circumferential surface of an inner peripheral edge portion of the inner disk and is formed of a resin such as PCTFE (heat resistant temperature: about 120° C.), for example. Therefore, in a case in which the temperature of a fluid flowing through the valve reaches a high temperature that is equal to or greater than 300° C., for example, it is also necessary for the valve seat that comes into contact with the high-temperature fluid to secure equivalent heat resistance.

Also, if the valve seat shrinks after coming into contact with the high-temperature fluid and causing heat expansion, stress concentration on a flange-like attachment portion attached to the inner peripheral edge portion of the inner disk of the valve seat may occur. The concentration of the stress may cause deformation of the valve seat, or depending on materials, there is a concern that cracking, tearing-off, and the like of the valve seat may occur and the sealing property of the valve may be degraded.

Further, the valve seat described in Patent Document 1 includes a valve seat portion, which projects, on which the diaphragm abuts when the valve is closed, a flange-like attachment portion that is attached to the inner peripheral edge portion of the inner disk, and an abutting portion that is caused to abut on the bottom surface of the recessed portion in which the inner disk of the body of the valve is accommodated. The valve seat including these parts inevitably has a large volume. Therefore, if such a valve seat with a large volume is exposed to a high temperature, influences of the heat expansion become further significant, and there is a concern that it may become more difficult to secure the sealing property of the valve.

In view of such a problem, disclosed embodiments of the present invention provide a valve device capable of securing a sealing property by curbing influences of heat expansion even in a case in which a high-temperature fluid flows through a flow path.

Means for Solving the Problems

In some embodiments, a valve device according to the present invention includes: a body that includes flow paths, a recessed portion where the flow paths are opened, and a valve chamber with which the flow paths communicate at the recessed portion; an inner disk that is accommodated in the recessed portion and sections the flow paths until they reach the valve chamber with an inner peripheral edge portion and an outer peripheral edge portion; a diaphragm that blocks or establishes communication of the flow paths in the valve chamber; a first annular surface that is formed at the inner peripheral edge portion on a side facing the valve chamber; a second annular surface that is formed at the inner peripheral edge portion on a side opposite to the first annular surface and is supported by a bottom surface of the recessed portion; a first sealing portion, which is held by the first annular surface, on and from which the diaphragm is seated and separated in accordance with the blocking or the communication of the flow paths; and a second sealing portion that is disposed between the second annular surface and the bottom surface of the recessed portion.

Advantageous Effects of the Invention

According to embodiments of the valve device of the present invention, it is possible to secure a sealing property by curbing influences of heat expansion even in a case in which a high-temperature fluid flows through a flow path.

The present summary is provided only by way of example and not limitation. Other aspects of the present invention will be appreciated in view of the entirety of the present disclosure, including the entire text, claims and accompanying figures.

Figure 1:
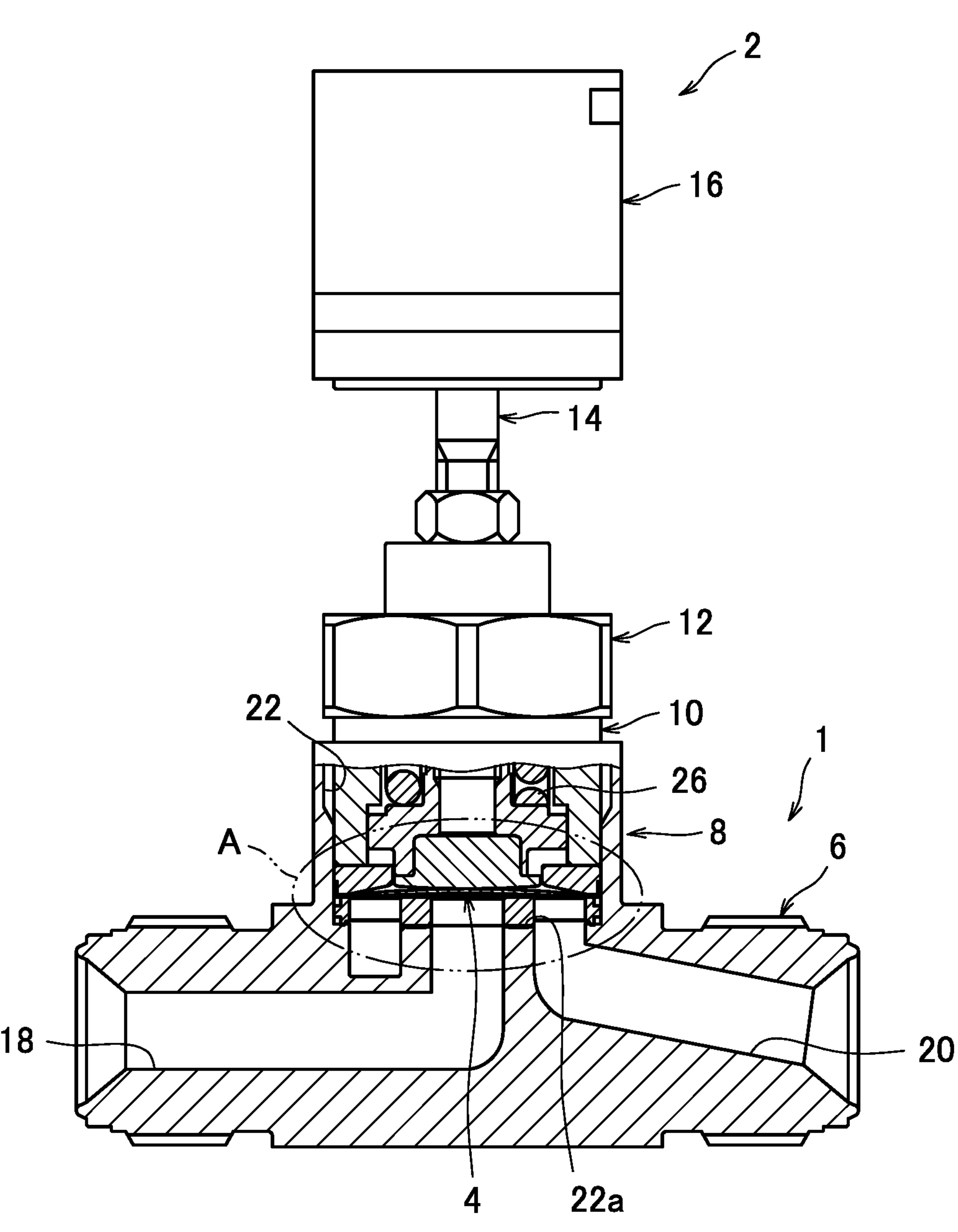
FIG. 1 is a partial vertical sectional view of a valve including a valve device according to a first embodiment of the present invention.

While the above-identified figures set forth one or more embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps, and/or components not specifically shown in the drawings.

ILLUSTRATIVE MODE FOR CARRYING OUT THE INVENTION

Hereinafter, a valve device according to embodiments of the present invention will be described with reference to the drawings. Note that description of FIGS. 1 to 3 and FIGS. 5 to 7 will be given with the upper side in each drawing defined as an upward direction.

First Embodiment

FIG. 1 illustrates a partial vertical sectional view of a valve 2 including a valve device 1 according to a first embodiment of the present invention. The valve 2 is a metal diaphragm valve of a direct touch type that includes a diaphragm 4 as a valve body and is capable of controlling a minute flow amount of a process fluid with high precision.

The valve 2 includes a body 6, a valve main body 8, a bonnet 10, a bonnet nut 12, a stem 14, an actuator 16, and the like. The body 6 is formed of a metal material such as stainless steel, and an inlet flow path 18, an outlet flow path 20, and a recessed portion 22 that is opened on the upper side are formed therein. The inlet flow path 18 and the outlet flow path 20 are opened in a bottom surface 22*a* of the recessed portion 22, and the valve main body 8 is accommodated in the recessed portion 22. The valve device 1 is configured of the body 6 and the valve main body 8 accommodated in the recessed portion 22 of the body 6.

Figure 2:
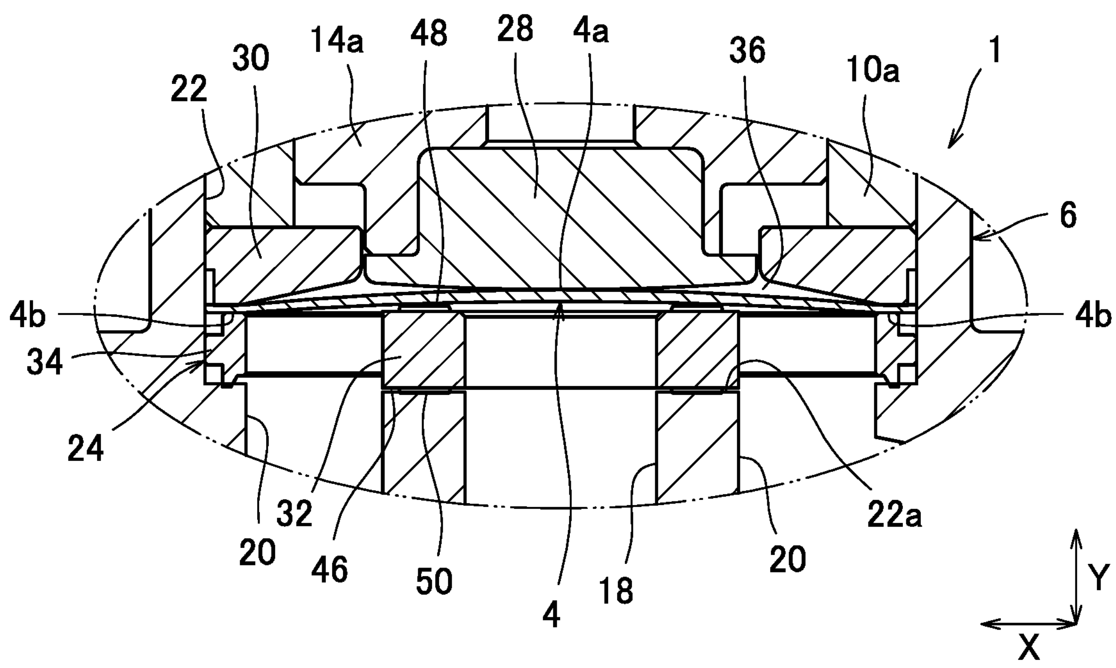
FIG. 2 is a vertical sectional view illustrating the region A in FIG. 1 in the valve device in an enlarged manner.

FIG. 2 illustrates a vertical sectional view illustrating the region A in FIG. 1 in the valve device 1 in an enlarged manner. The valve main body 8 is configured of the diaphragm 4, an inner disk 24, a lower end portion 10*a* of the bonnet 10, a lower large diameter portion 14*a* of the stem 14, a spring 26 (see FIG. 1), a diaphragm pressor 28, a pressor adaptor 30, and the like.

The diaphragm 4 is formed of a single thin plate or a plurality of laminated thin plates that can be separated from each other, and these thin plates are formed into dish shapes with the center portion 4*a* of the diaphragm 4 expanding upward. The thin plates have a thickness that is as very thin as about 0.1 mm to 0.2 mm, for example, and are formed of a metal material such as stainless steel or another shape memory alloy.

The inner disk 24 is formed of a metal material such as stainless steel, includes an inner peripheral edge portion 32 and an outer peripheral edge portion 34, and is placed on the bottom surface 22*a* of the recessed portion 22. The diaphragm 4 and the pressor adaptor 30 are disposed on the outer peripheral edge portion 34 in this order. The bonnet 10 has a tubular shape and is inserted into the recessed portion 22, and the lower end portion 10*a* of the bonnet 10 is pressed against the pressor adaptor 30 by fastening the bonnet nut 12. In this manner, a peripheral edge portion 4*b* of the diaphragm 4 is pressed against and held by the outer peripheral edge portion 34 of the inner disk 24 by the pressor adaptor 30.

The stem 14 is inserted into the bonnet 10 such that it can move upward and downward, and the diaphragm pressor 28 formed of a resin material or the like is fitted to the lower large diameter portion 14*a*. The diaphragm pressor 28 abuts on the upper surface of the diaphragm 4 at the center portion 4*a* in the radial direction and presses the diaphragm 4 from the upper side in a state in which the valve is opened as in FIG. 1 such that excessive bending thereof is curbed. The upper portion of the stem 14 projects from the upper portion of the bonnet 10 and is inserted into the actuator 16.

The actuator 16 is a drive mechanism of an air operation scheme, for example, and moves the stem 14 upward and downward using an elastic force of the coil-shaped spring 26 disposed in the recessed portion 22 and a pressure of the operation air supplied to the actuator 16. If the supply of the operation air to the actuator 16 is blocked, for example, the elastic force of the spring 26 acts on the lower large diameter portion 14*a*, the stem 14 is lowered, the lower large diameter portion 14*a* is lowered, the center portion 4*a* of the diaphragm 4 is thus pressed by the diaphragm pressor 28, and the diaphragm 4 closes the opening of the inlet flow path 18 and thus leads to a valve closed state.

On the other hand, the stem 14 is lifted, and the lower large diameter portion 14*a* is lifted against the elastic force of the spring 26 by supplying the operation air to the actuator 16. In this manner, the diaphragm pressor 28 is also lifted, the diaphragm 4 is returned to a natural state in which it is curved upward, the inlet flow path 18 is opened, and the valve 2 is brought into a valve opened state, as illustrated in FIG. 2.

A valve chamber 36 with which the inlet flow path 18 and the outlet flow path 20 communicate is formed in the recessed portion 22. The valve chamber 36 is a region, which is surrounded by the pressor adaptor 30, the diaphragm pressor 28, and the inner disk 24, into which a fluid flows from the inlet flow path 18. The diaphragm 4 blocks or establishes communication of the inlet and outlet flow paths 18 and 20 through curved deformation in the valve chamber 36.

Figure 3:
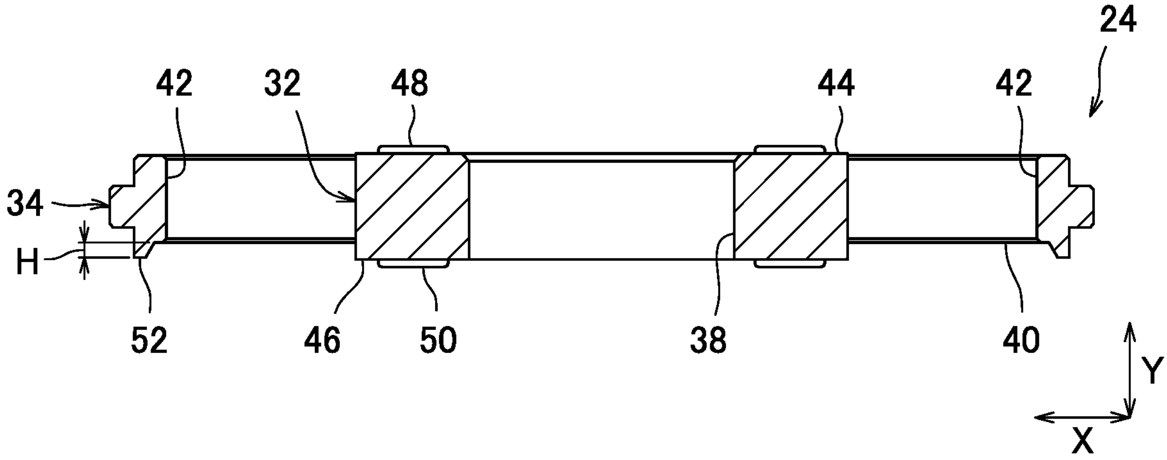
FIG. 3 is a vertical sectional view of an inner disk.
Figure 4:
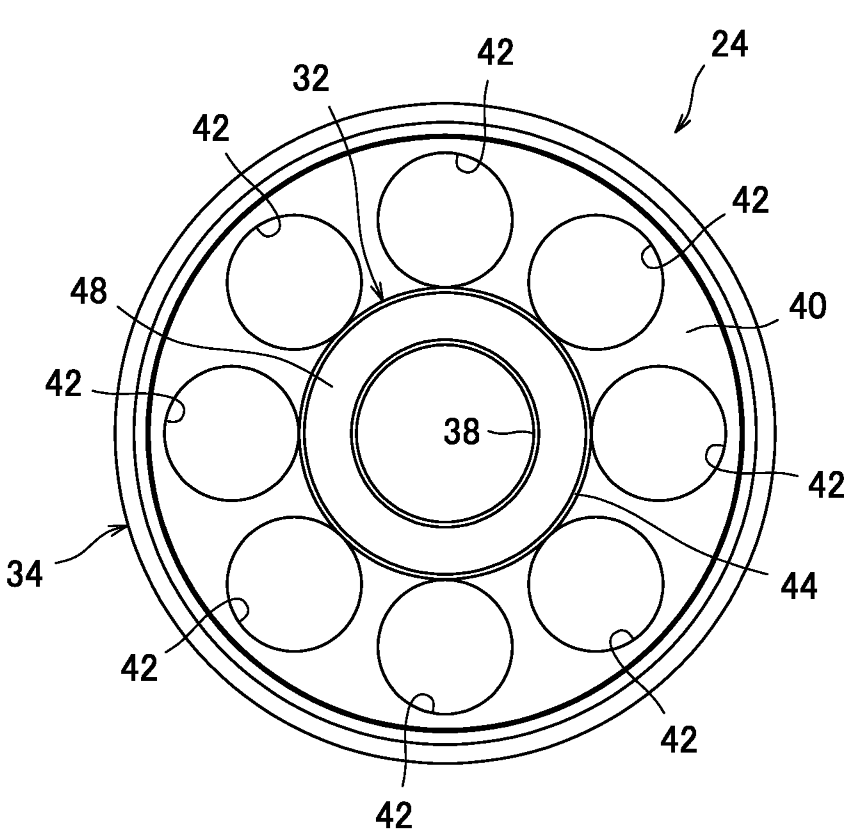
FIG. 4 is a top view of the inner disk.

FIG. 3 illustrates a vertical sectional view of the inner disk 24, and FIG. 4 illustrates a top view of the inner disk 24. The inner disk 24 is accommodated in the recessed portion 22 and sections the inlet and outlet flow paths 18 and 20 until they reach the valve chamber 36 with the inner peripheral edge portion 32 and the outer peripheral edge portion 34, as illustrated in FIG. 2.

Specifically, a through-hole 38 that communicates with the inlet flow path 18 is formed inside the inner peripheral edge portion 32, and an intermediate annular portion 40 is formed between the inner peripheral edge portion 32 and the outer peripheral edge portion 34 as illustrated in FIG. 4. A plurality of through-holes 42 are formed in the intermediate annular portion 40 along the circumferential direction thereof, and each through-hole 42 communicates with the outlet flow path 20. In this manner, the inlet and outlet flow paths 18 and 20 are sectioned until they reach the valve chamber 36 in the inner disk 24.

A first annular surface 44 is formed at the inner peripheral edge portion 32 on the side facing the valve chamber 36, that is, on the upper surface of the inner peripheral edge portion 32 when seen in FIG. 3. Also, a second annular surface 46 is formed on the side opposite to the first annular surface 44, that is, on the lower surface of the inner peripheral edge portion 32 when seen in FIG. 3. The second annular surface 46 is supported by the bottom surface 22*a* of the recessed portion 22 via a second sealing portion 50, which will be described later, as illustrated in FIG. 2.

The first and second annular surfaces 44 and 46 are annular flat surfaces, and a first sealing portion 48 is attached to and held by the first annular surface 44 with an adhesive or the like. The diaphragm 4 is seated on and separated from the first sealing portion 48 in accordance with blocking or communication of the inlet and outlet flow paths 18 and 20. Also, a second sealing portion 50 is disposed between the second annular surface 46 and the bottom surface 22*a* of the recessed portion 22. Note that the second sealing portion 50 may be attached to and held by the second annular surface 46 or the bottom surface 22*a* with an adhesive or the like.

The first and second sealing portions 48 and 50 have annular sheet shape, and both of them are formed of fluorine rubber. More specifically, the first and second sealing portions 48 and 50 are formed of fluorine rubber (for example, a fluorine rubber material "Kalrez (registered trademark)" manufactured by DuPont) that is durable even in a case in which the temperature of the fluid flowing through the inlet and outlet flow paths 18 and 20 reaches a temperature that is as high as 300° C. or higher, for example.

As illustrated in FIG. 3, an annular projecting portion 52 is formed at the outer peripheral edge portion 34 toward the bottom surface 22*a* of the recessed portion 22, that is, toward the lower side in FIG. 3. The projecting portion 52 is formed to have a projection height H in a thickness direction Y of the inner disk 24. If the bonnet nut 12 is fastened, and the lower end portion 10*a* of the bonnet 10 is pressed against the pressor adaptor 30, then the tip of the projecting portion 52 abuts on the facing bottom surface 22*a* of the recessed portion 22.

The outer peripheral edge portion 34 is held by the bottom surface 22*a* of the recessed portion 22, and sealing at the outer peripheral edge portion 34 is established, through the abutting of the projecting portion 52. Moreover, the second sealing portion 50 is pressed to collapse to an appropriate degree between the second annular surface 46 and the bottom surface 22*a* of the recessed portion 22.

As described above, the diaphragm 4 is seated on and separated from the first sealing portion 48 in accordance with blocking or communication of the inlet and outlet flow paths 18 and 20, and the first sealing portion 48 has a function of a valve seat portion of a conventional valve seat, in the present embodiment. On the other hand, the second sealing portion 50 has a function of an abutting portion that is caused to abut on the bottom surface 22*a* of the recessed portion 22 in the conventional valve seat.

In this manner, the valve seat in the valve device 1 is formed of two different members, namely the first and second sealing portions 48 and 50 disposed at different parts, namely the first and second annular surfaces 44 and 46, respectively, in the present embodiment. It is thus not necessary to provide a flange-like attachment portion of the valve seat in the prior art.

Since the attachment portion of the valve seat is not present, occurrence of deformation, cracking, tearing-off, or the like of the valve seat that may be caused by concentration of stress on the attachment portion is curbed. Also, it is possible to form the valve seat with a small volume in a state in which no attachment portion is included and thereby to curb influences of heat expansion even in a case in which a high-temperature fluid flows through the valve device 1. Therefore, it is possible to secure a sealing property of the valve device 1.

Also, it is possible to avoid metal touch between the inner disk 24 and the bottom surface 22*a* of the recessed portion 22 of the body 6 by providing the second sealing portion 50 that has a function of an abutting portion that is caused to abut on the bottom surface 22*a* of the recessed portion 22. In this manner, it is possible to curb occurrence of particles due to metal touch at the second annular surface 46 and thereby to minimize a proportion of defective semiconductor products due to mixing of particles by applying the valve 2 to a semiconductor manufacturing device, for example.

Also, it is possible to form the valve seat to have a necessary minimum volume within a range in which the first and second sealing portions 48 and 50 can exhibit each of the aforementioned functions by the first and second sealing portions 48 and 50 having annular sheet shapes. Therefore, it is possible to further effectively curb influences of heat expansion and to further effectively maintain a sealing property of the valve device 1 even in a case in which a high-temperature fluid flows through the valve device 1.

Also, it is possible to improve heat resistance of the valve seat as compared with a case in which the first and second sealing portions 48 and 50 are made of a resin, by the first and second sealing portions 48 and 50 formed of fluorine rubber. Here, since the valve seat made of rubber typically has a higher heat expansion rate as compared with a resin, and stress concentration is likely to occur at the attachment portion of the valve seat with respect to the inner peripheral edge portion of the inner disk in the prior art if the valve seat shrinks after coming into contact with the high-temperature fluid and causing heat expansion.

However, since such an attachment portion is not present in the present embodiment, the occurrence of stress concentration is curbed. Particularly, it is possible to realize the first and second sealing portions 48 and 50 that are durable even in a case in which a high-temperature fluid at 300° C. or higher flows through the inlet and outlet flow paths 18 and 20 by forming the first and second sealing portions 48 and 50 using the fluorine rubber material such as "Kalrez (registered trademark)" described above. Therefore, in this case, it is possible to realize the valve device 1 that secures a sealing property while curbing influences of heat expansion and has heat resistance at 300° C. or higher.

Also, the projecting portion 52 formed at the outer peripheral edge portion 34 is formed to have the projection height H in the thickness direction Y. In this manner, if the bonnet nut 12 is fastened, and the lower end portion 10*a* of the bonnet 10 is pressed against the pressor adaptor 30, then the tip of the projecting portion 52 abuts on the bottom surface 22*a* of the recessed portion 22.

The outer peripheral edge portion 34 is held by the bottom surface 22*a* of the recessed portion 22, and sealing at the outer peripheral edge portion 34 is established, through the abutting of the projecting portion 52. At this time, the second sealing portion 50 is pressed to collapse to an appropriate degree between itself and the bottom surface 22*a* of the recessed portion 22 by adjusting the projecting height H in advance, and a sealing property between the second annular surface 46 and the facing bottom surface 22*a* of the recessed portion 22 of the body 6 is secured at the second annular surface 46. Moreover, it is possible to curb occurrence of particles due to metal touch between the second annular surface 46 and the bottom surface 22*a* of the recessed portion 22.

Second Embodiment

Figure 5:
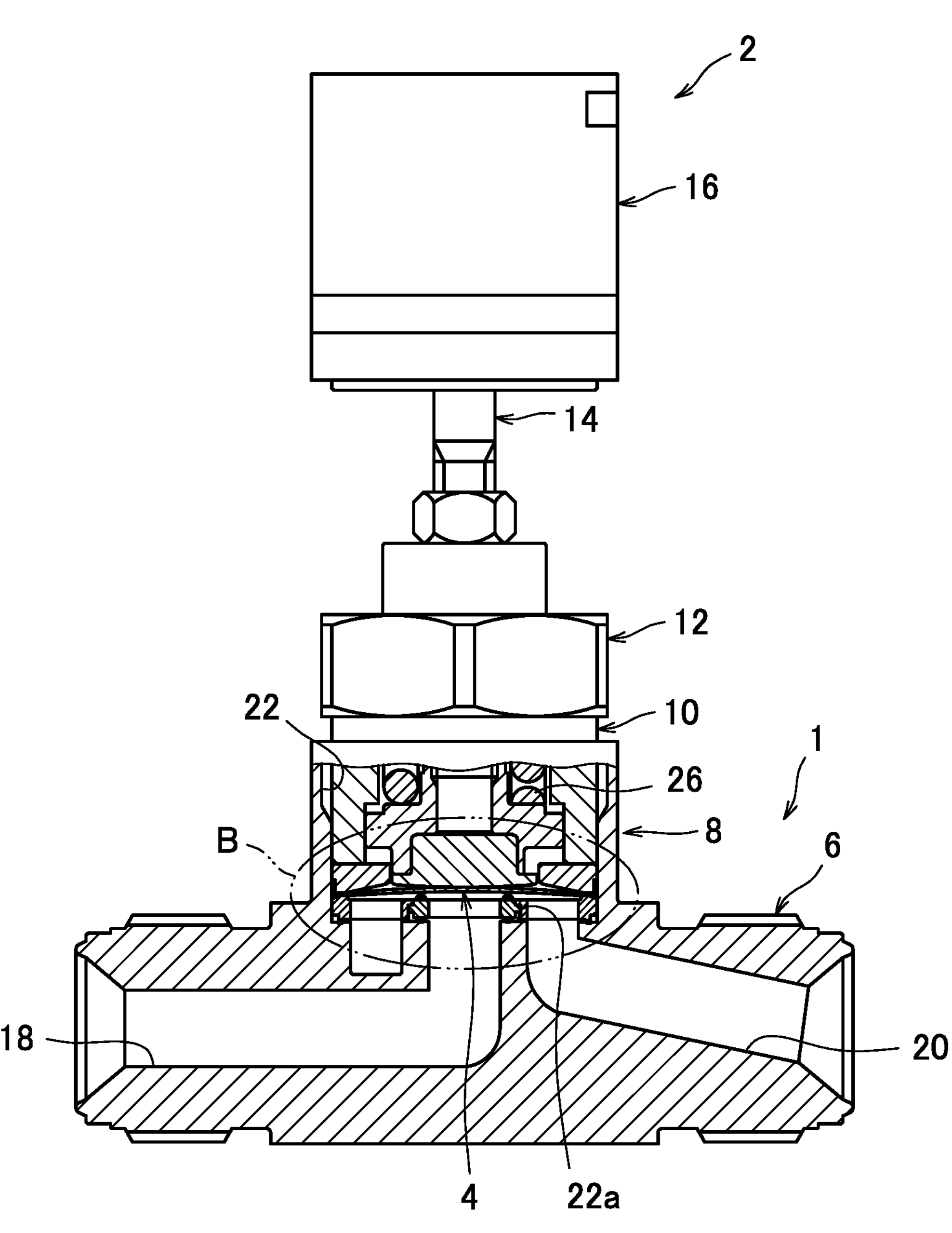
FIG. 5 is a partial vertical sectional view of a valve including a valve device according to a second embodiment of the present invention.

FIG. 5 illustrates a partial vertical sectional view of a valve 2 including a valve device 1 according to a second embodiment of the present invention. Note that in the following description, characteristic parts of the second embodiment will be mainly described, the same reference signs will be applied to configurations similar to those in the first embodiment in the drawings, and description thereof may be omitted.

The valve 2 is a metal diaphragm valve of a direct touch type including a diaphragm 4, a body 6, a valve main body 8, a bonnet 10, a bonnet nut 12, a stem 14, an actuator 16, and the like. An inlet flow path 18, an outlet flow path 20, and a recessed portion 22 are formed in the body 6, the inlet flow path 18 and the outlet flow path 20 are opened in a bottom surface 22*a* of the recessed portion 22, and the valve main body 8 is accommodated therein. The valve device 1 is configured of the body 6 and the valve main body 8 accommodated in the recessed portion 22 of the body 6.

Figure 6:
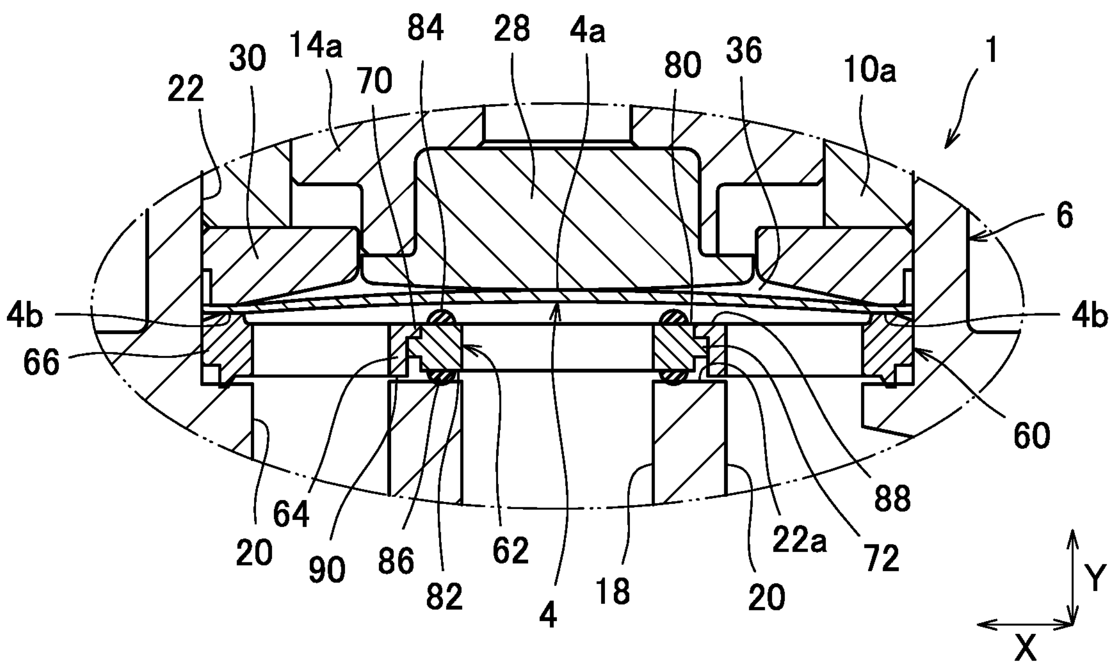
FIG. 6 is a vertical sectional view illustrating the region B in FIG. 5 in the valve device in an enlarged manner.

FIG. 6 illustrates a vertical sectional view illustrating the region B in FIG. 5 in the valve device 1 in an enlarged manner. The valve main body 8 is configured of the diaphragm 4, a first inner disk 60, a second inner disk 62, a lower end portion 10*a* of the bonnet 10, a lower large diameter portion 14*a* of the stem 14, a spring 26 (see FIG. 5), a diaphragm pressor 28, a pressor adaptor 30, and the like. In other words, the inner disk in the present embodiment is configured of two members, namely the first inner disk 60 and the second inner disk 62.

The first inner disk 60 is formed of a metal material such as stainless steel, includes an inner peripheral edge portion 64 and an outer peripheral edge portion 66, and is placed on the bottom surface 22*a* of the recessed portion 22. The second inner disk 62 is formed of a metal material that is similar to that of the first inner disk 60 and is disposed on the inner side of the inner peripheral edge portion 64 in the radial direction, and the diaphragm 4 and the pressor adaptor 30 are disposed on the outer peripheral edge portion 66 of the first inner disk 60 in this order.

The lower end portion 10*a* of the bonnet 10 is pressed against the pressor adaptor 30 by inserting the bonnet 10 into the recessed portion 22 and fastening the bonnet nut 12. In this manner, the peripheral edge portion 4*b* of the diaphragm 4 is pressed against and held by the outer peripheral edge portion 66 of the first inner disk 60 by the pressor adaptor 30.

Figure 7:
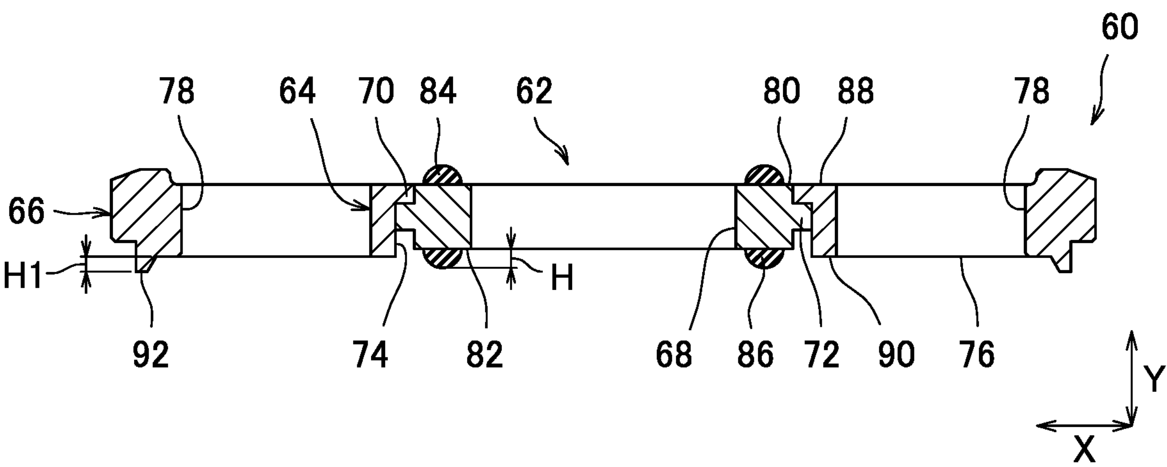
FIG. 7 is a vertical sectional view of a first inner disk with a second inner disk assembled therewith.
Figure 8:
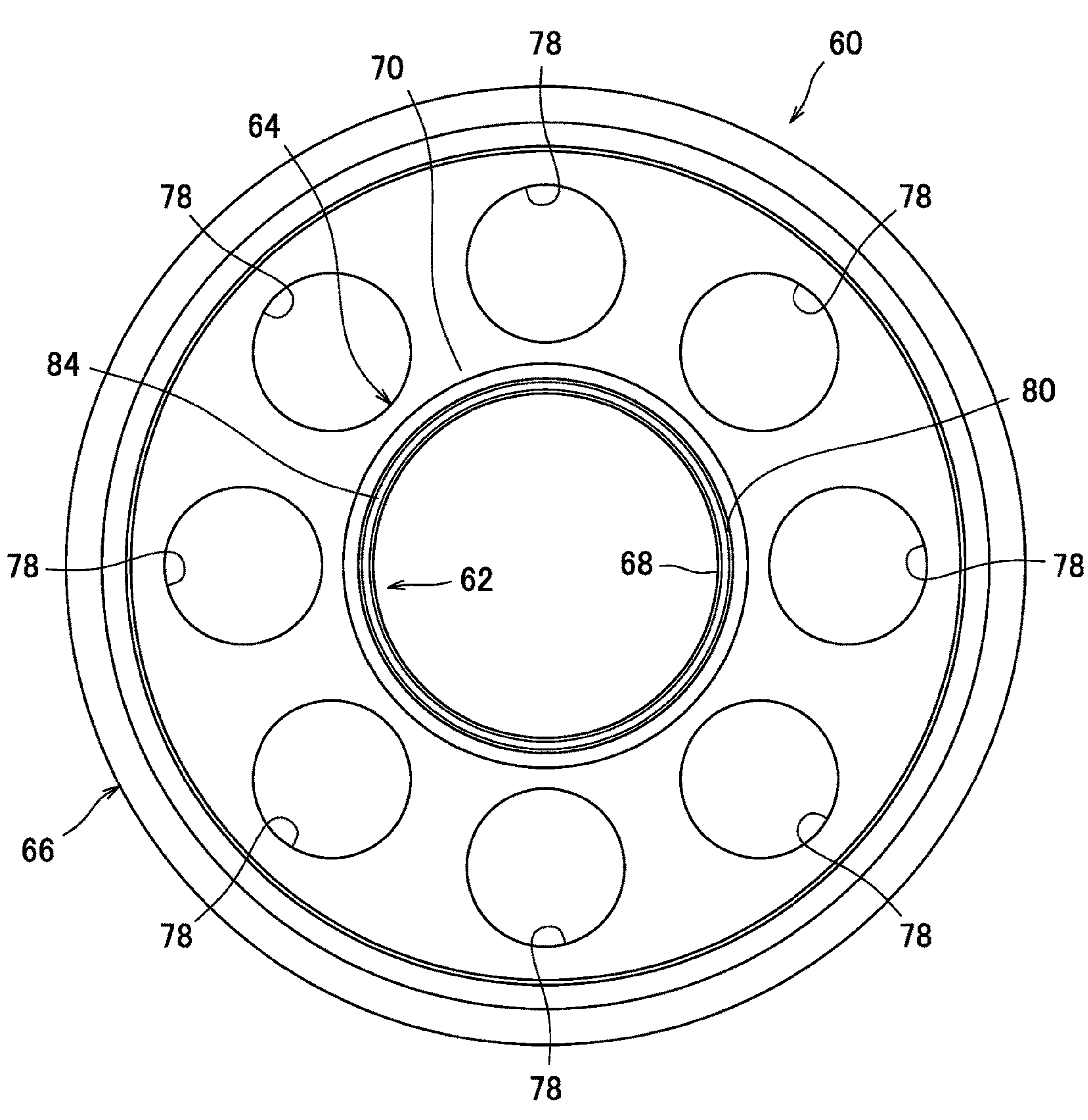
FIG. 8 is a top view of the first inner disk with the second inner disk assembled therewith.

FIG. 7 illustrates a vertical sectional view of the first inner disk 60 with the second inner disk 62 assembled therewith, and FIG. 8 illustrates a top view of the first inner disk 60 with the second inner disk 62 assembled therewith. The first inner disk 60 is accommodated in the recessed portion 22 and sections the inlet and outlet flow paths 18 and 20 until they reach the valve chamber 36 with the inner peripheral edge portion 64 and the outer peripheral edge portion 66, as illustrated in FIG. 6.

The second inner disk 62 has an annular shape with a through-hole 68 formed therein and is disposed on the inner side of the inner peripheral edge portion 64 of the first inner disk 60 in the radial direction X such that it is movable in the thickness direction Y of the first inner disk 60 and is detachable from the first inner disk 60. Regulating portions 10 and 72 are formed in the inner circumferential surface of the inner peripheral edge portion 64 and the outer circumferential surface of the second inner disk 62, respectively, to project in the radial direction X. Movement of the second inner disk 62 to the side of the valve chamber 36 in the thickness direction Y is regulated by the pair of regulating portions 70 and 72 abutting on each other.

Figure 9:
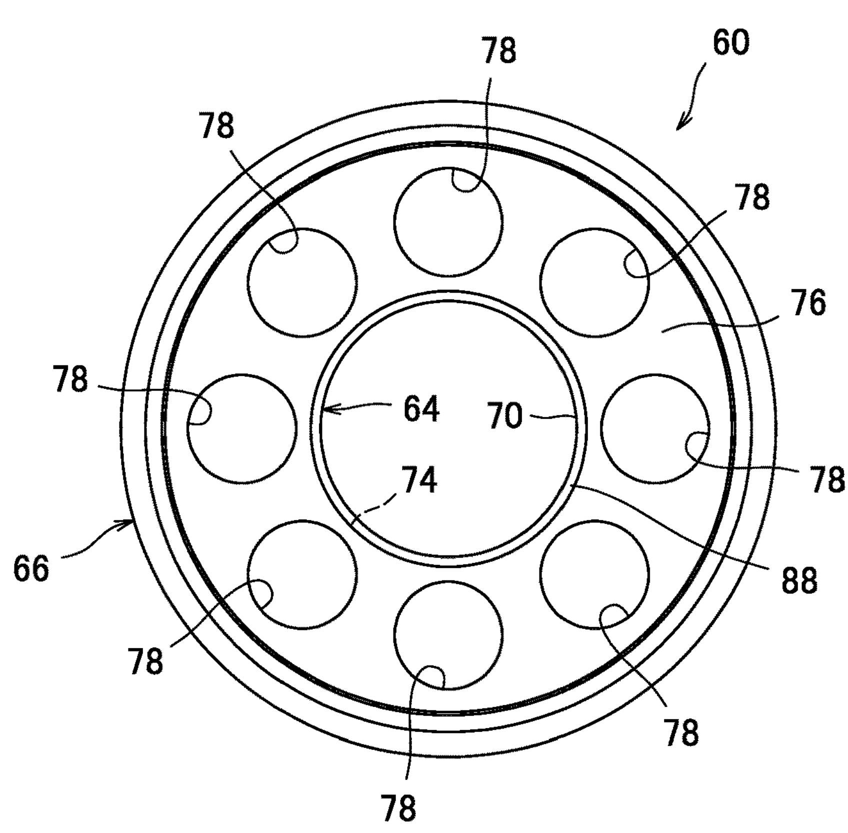
FIG. 9 is a top view of the first inner disk.

FIG. 9 illustrates a top view of the first inner disk 60. A through-hole 74 is formed on the inner side of the inner peripheral edge portion 64 of the first inner disk 60. The through-hole 74 communicates with the inlet flow path 18 via the through-hole 68 in the second inner disk 62. Also, an intermediate annular portion 76 is formed between the inner peripheral edge portion 64 and the outer peripheral edge portion 66. A plurality of through-holes 78 are formed in the intermediate annular portion 76 along the circumferential direction thereof, and each through-hole 78 communicates with the outlet flow path 20. In this manner, the inlet and outlet flow paths 18 and 20 are sectioned until they reach the valve chamber 36 in the first inner disk 60.

Figure 10:
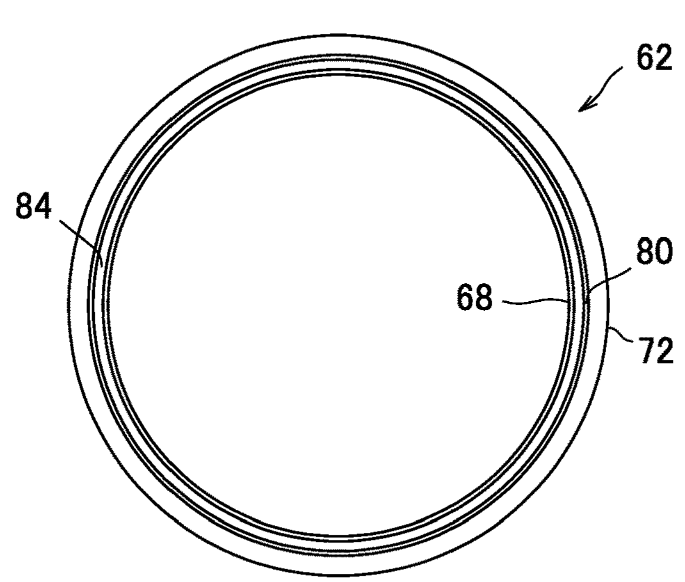
FIG. 10 is a top view of the second inner disk.

FIG. 10 illustrates a top view of the second inner disk 62. A first annular surface 80 is formed in the second inner disk 62 on the side facing the valve chamber 36, that is, on the upper surface of the second inner disk 62 when seen in FIG. 7. Also, a second annular surface 82 is formed on the side opposite to the first annular surface 80, that is, on the lower surface of the second inner disk 62 when seen in FIG. 7. The second annular surface 82 is supported by the bottom surface 22*a* of the recessed portion 22 via a second sealing portion 86, which will be described later, as illustrated in FIG. 6.

The first and second annular surfaces 80 and 82 are annular flat surfaces, and a first sealing portion 84 is attached to and held by the first annular surface 80 with an adhesive or the like. The diaphragm 4 is seated on and separated from the first sealing portion 84 in accordance with blocking or communication of the inlet and outlet flow paths 18 and 20. Also, the second sealing portion 86 is disposed between the second annular surface 82 and the bottom surface 22*a* of the recessed portion 22. The second sealing portion 86 is attached to and held by the second annular surface 82 with an adhesive or the like.

The first and second sealing portions 84 and 86 have annular projecting shapes, that is, projections from the first annular surface 80 and the second annular surface 82, respectively, and both of them are formed of fluorine rubber. More preferably, the first and second sealing portions 84 and 86 are formed of fluorine rubber (for example, a fluorine rubber material "Kalrez (registered trademark)" manufactured by DuPont) that is durable even in a case in which the temperature of a fluid flowing through the inlet and outlet flow paths 18 and 20 reaches a temperature that is as high as 300° C. or higher, for example.

Also, a third annular surface 88 is formed at the inner peripheral edge portion 64 on the side facing the valve chamber 36, that is, on the upper surface of the first inner disk 60 when seen in FIG. 7 in the first inner disk 60. Also, a fourth annular surface 90 is formed on the side opposite to the third annular surface 88, that is, on the lower surface of the first inner disk 60 when seen in FIG. 7.

Also, the third annular surface 88 is substantially flush with the first annular surface 80 in the radial direction X in a state in which the pair of regulating portions 70 and 72 abut on each other as illustrated in FIG. 6. In addition, the second sealing portion 86 projects toward the bottom surface 22*a* of the recessed portion 22 with the projection height H that is greater than the height with which the second sealing portion 86 is flush with the fourth annular surface 90 in the radial direction X in the state in which the pair of regulating portions 70 and 72 abut on each other, as illustrated in FIG. 7. In this manner, the fourth annular surface 90 is separated from the bottom surface 22*a* of the recessed portion 22 as illustrated in FIG. 6.

Also, an annular projecting portion 92 is formed at the outer peripheral edge portion 66 to project toward the bottom surface 22*a* of the recessed portion 22, that is, toward the lower side in FIG. 7 as illustrated in FIG. 7. The projecting portion 92 is formed with a projection height H1 in the thickness direction Y. If the bonnet nut 12 is fastened, and the lower end portion 10*a* of the bonnet 10 is pressed against the pressor adaptor 30, then the tip of the projecting portion 92 abuts on the facing bottom surface 22*a* of the recessed portion 22.

The outer peripheral edge portion 66 is held by the bottom surface 22*a* of the recessed portion 22, and sealing at the outer peripheral edge portion 66 is established, through the abutting of the projecting portion 92. Moreover, the second sealing portion 86 is pressed to collapse to an appropriate degree between the second annular surface 82 and the bottom surface 22*a* of the recessed portion 22.

As described above, the valve device 1 according to the present embodiment includes the second inner disk 62 disposed on the inner side of the inner peripheral edge portion 64 of the first disk 60 in the radial direction X such that it is movable in the thickness direction Y of the first inner disk 60. Additionally, the first sealing portion 84 and the second sealing portion 86 are held by the first and second annular surfaces 80 and 82 of the second inner disk 62, respectively.

The first sealing portion 84 has a function of a valve seat portion of the conventional valve seat, on and from which the diaphragm 4 is seated and separated in accordance with blocking or communication of the inlet and outlet flow paths 18 and 20. On the other hand, the second sealing portion 86 has a function of an abutting portion that is caused to abut on the bottom surface 22*a* of the recessed portion 22 in the conventional valve seat.

In this manner, the valve seat in the valve device 1 is formed of two different members, namely the first and second sealing portions 84 and 86 that are provided at separate parts, namely the first and second annular surfaces 80 and 82, respectively in the present embodiment. In this manner, it is not necessary to provide a flange-like attachment portion in the conventional valve seat.

Since the attachment portion of the valve seat is not present, occurrence of deformation, cracking, tearing-off, and the like of the valve seat caused by stress concentration on the attachment portion is curbed. Also, it is possible to form the valve seat to have a small volume in a state in which no attachment portion is included and thereby to curb influences of heat expansion even in a case in which a high-temperature fluid flows through the valve device 1. It is thus possible to secure a sealing property of the valve device 1.

Also, it is possible to avoid metal touch between the second inner disk 62 and the bottom surface 22*a* of the recessed portion 22 by providing the second sealing portion 86 that has a function of the abutting portion that is caused to abut on the bottom surface 22*a* of the recessed portion 22. It is thus possible to curb occurrence of particles due to metal touch at the second annular surface 82 and thereby to minimize a proportion of defective semiconductors due to mixing of particles by applying the valve 2 to a semiconductor manufacturing device, for example.

Further, the second inner disk 62 is movable within a range regulated by the pair of regulating portions 70 and 72 in the thickness direction Y relative to the first inner disk 60. In this manner, the second sealing portion 86 is pressed against the bottom surface 22*a* of the recessed portion 22 in a valve closed state in which the diaphragm 4 abuts on the first sealing portion 84, and it is thus possible to prevent the fluid from flowing out to the outlet flow path 20 by the second sealing portion 86 reliably establishing sealing.

Also, the second inner disk 62 is detachable from the first inner disk 60. In this manner, it is possible to perform replacement with the entire second inner disk 62 including new first and second sealing portions 84 and 86 in a case in which the first and second sealing portions 84 and 86 are degraded with time. It is thus possible to provide a valve device 1 capable of maintaining a sealing property even after utilization over time.

Also, it is possible to form the valve seat to have a necessary minimum volume within a range in which the first and second sealing portions 84 and 86 can exhibit each of the aforementioned functions by the first and second sealing portions 84 and 86 forming protrusions projecting from the first annular surface 80 and the second annular surface 82, respectively. It is thus possible to further effectively curb influences of heat expansion even in a case in which a high-temperature fluid flows through the valve device 1 and thereby to further effectively maintain a sealing property of the valve device 1.

Particularly, forming the first sealing portion 84 as a protrusion makes the diaphragm 4 to easily cause abutting when the valve is closed, and it is thus possible to improve a closing property of the valve 2. Also, it is possible to improve heat resistance of the valve seat as compared with a case in which the first and second sealing portions 84 and 86 are made of a resin, by the first and second sealing portions 84 and 86 being formed of fluorine rubber. Here, since the valve seat made of rubber typically has a higher heat expansion rate as compared with a resin, stress concentration is likely to occur at the attachment portion of the valve seat with respect to the inner peripheral edge portion of the inner disk in the prior art if the valve seat shrinks after coming into contact with a high-temperature fluid and causing heat expansion.

However, since such an attachment portion is not present, occurrence of stress concentration is curbed in the present embodiment. Particularly, it is possible to realize the first and second sealing portions 84 and 86 that are durable even in a case in which a high-temperature fluid at 300° C. or higher flows through the inlet and outlet flow paths 18 and 20 by forming the first and second sealing portions 84 and 86 using the fluorine rubber material such as "Kalrez (registered trademark)" described above. Therefore, in this case, it is possible to realize the valve device 1 that secures a sealing property while curbing influences of heat expansion and has heat resistance at 300° C. or higher.

Also, the third annular surface 88 at the inner peripheral edge portion 64 of the first inner disk 60 is substantially flush with the first annular surface 80 in the radial direction X in a state in which the pair of regulating portions 70 and 72 abut on each other. In this manner, excessive projection of the second inner disk 62 in the valve chamber 36 is prevented, the volume of the valve chamber 36 is secured, and the flow of the fluid in the valve chamber 36 is not inhibited by the second inner disk 62.

Also, the second sealing portion 86 projects toward the bottom surface 22*a* of the recessed portion 22 with the projection height H that is greater than the height with which the second sealing portion 86 is flush with the fourth annular surface 90 in the radial direction X in the state in which the pair of regulating portions 70 and 72 abut on each other. In this manner, the fourth annular surface 90 is separated from the bottom surface 22*a* of the recessed portion 22 as illustrated in FIG. 6, and it is thus possible to curb occurrence of particles due to metal touch between the fourth annular surface 90 and the bottom surface 22*a* of the recessed portion 22.

Also, the projecting portion 92 formed at the outer peripheral edge portion 66 is formed with the projection height H1 in the thickness direction Y. In this manner, if the bonnet nut 12 is fastened, and the lower end portion 10*a* of the bonnet 10 is pressed against the pressor adaptor 30, the tip of the projecting portion 92 abuts on the bottom surface 22*a* of the recessed portion 22.

The outer peripheral edge portion 66 is held by the bottom surface 22*a* of the recessed portion 22, and sealing at the outer peripheral edge portion 66 is performed, through the abutting of the projecting portion 92. At this time, the second sealing portion 86 is pressed to collapse to an appropriate degree between itself and the bottom surface 22*a* of the recessed portion 22 by adjusting the projecting height H1 in advance, and a sealing property between the second annular surface 82 and the facing bottom surface 22*a* of the recessed portion 22 of the body 6 is secured at the second annular surface 82. Moreover, it is possible to curb occurrence of particles due to metal touch between the second annular surface 82 and the bottom surface 22*a* of the recessed portion 22.

Although the description of each embodiment of the present invention will now be ended, the present invention is not limited to the aforementioned embodiments, and various modifications can be made without departing from the gist of the present invention.

For example, the shape of the first and sealing portions 48 and 50 is not limited to the sheet shape as long as it is possible to cause the first and second sealing portions 48 and 50 to have necessary functions with relatively small volumes and it is possible to secure the flow amount of the fluid in the valve chamber 36. For example, at least the first sealing portion 48 may be formed into a protrusion projecting from the first annular surface 44. In this manner, it is possible to cause the diaphragm 4 to reliably abut only on the first sealing portion 48 when the valve is closed.

Similarly, the shape of the first and second sealing portions 84 and 86 is not limited to a protrusion in the second embodiment as well, as long as it is possible to cause the first and second sealing portions 84 and 86 to have necessary functions with relatively small volumes and it is possible to secure the flow amount of the fluid in the valve chamber 36. For example, the first and second sealing portions 84 and 86 may have an annular sheet shape or may have a shape provided with a protrusion with a semicircular section with a level difference on an annular sheet shape.

In each embodiment, the members constituting the valve device 1 and thus the valve 2 are not limited to the aforementioned materials except for the inner disk 24, the first and second inner disks 60 and 62, the first sealing portions 48 and 84, and the second sealing portions 50 and 86. Although the valve device 1 is driven by the actuator 16 that is a drive mechanism of an air operation scheme, the valve device 1 is not limited thereto and can be applied to valves 2 of various drive mechanisms.

EXPLANATION OF REFERENCE SIGNS

1 valve device
4 diaphragm
4*b* peripheral edge portion
6 body
18 inlet flow path (flow path)
20 outlet flow path (flow path)
22 recessed portion
22*a* bottom surface
24 inner disk
32, 64 inner peripheral edge portion
34, 66 outer peripheral edge portion
36 valve chamber
44, 80 first annular surface
46, 82 second annular surface
48, 84 first sealing portion
50, 86 second sealing portion
52, 92 projecting portion
60 first inner disk (inner disk)
62 second inner disk (inner disk)
70, 72 regulating portion
88 third annular surface
90 fourth annular surface Although the present invention has been described with reference to preferred embodiments, workers skilled in the art will recognize that changes may be made in form and detail without departing from the spirit and scope of the invention.

The invention claimed is:

1. A valve device comprising:

a body that includes flow paths, a recessed portion where the flow paths are opened, and a valve chamber with which the flow paths communicate at the recessed portion;

an inner disk that is accommodated in the recessed portion and sections the flow paths until the flow paths reach the valve chamber with an inner peripheral edge portion and an outer peripheral edge portion;

a diaphragm that blocks or establishes communication of the flow paths in the valve chamber;

a first annular surface that is formed at the inner peripheral edge portion on a side facing the valve chamber;

a second annular surface that is formed at the inner peripheral edge portion on a side opposite to the first annular surface and is supported by a bottom surface of the recessed portion;

a first sealing portion configured as a valve seat body, which is held by the first annular surface, on and from which the diaphragm is seated and separated in accordance with the blocking or the communication of the flow paths; and a second sealing portion that is disposed between the second annular surface and the bottom surface of the recessed portion, wherein the first sealing portion and the second sealing portion each form a broad and thin annular sheet shape member.

2. The valve device according to claim 1, wherein the first sealing portion and the second sealing portion are made of fluorine rubber.

3. The valve device according to claim 1, wherein the outer peripheral edge portion includes a projecting portion that projects toward the bottom surface of the recessed portion in a thickness direction of the inner disk.

4. The valve device according to claim 1, wherein the first sealing portion configured as a valve seat body is uncoated.

5. A valve device comprising:

a body that includes flow paths, a recessed portion where the flow paths are opened, and a valve chamber with which the flow paths communicate at the recessed portion;

an inner disk that is accommodated in the recessed portion and sections the flow paths until the flow paths reach the valve chamber with an inner peripheral edge portion and an outer peripheral edge portion;

a diaphragm that blocks or establishes communication of the flow paths in the valve chamber;

a first annular surface that is formed at the inner peripheral edge portion on a side facing the valve chamber;

a second annular surface that is formed at the inner peripheral edge portion on a side opposite to the first annular surface and is supported by a bottom surface of the recessed portion;

a first sealing portion configured as a valve seat body, which is held by the first annular surface, on and from which the diaphragm is seated and separated in accordance with the blocking or the communication of the flow paths; and a second sealing portion that is disposed between the second annular surface and the bottom surface of the recessed portion, wherein the inner disk is configured of a first inner disk that is accommodated in the recessed portion and sections the flow paths until the flow paths reach the valve chamber with the inner peripheral edge portion and the outer peripheral edge portion, and a second inner disk that is detachably disposed on an inner side of the inner peripheral edge portion in a radial direction such that the second inner disk is movable in a thickness direction of the first inner disk, the first annular surface is formed at the second inner disk on a side facing the valve chamber, the second annular surface is formed at the second inner disk on a side opposite to the first annular surface and is supported by the bottom surface of the recessed portion, and the valve device further comprises a pair of regulating portions that are formed on an inner circumferential surface of the inner peripheral edge portion and an outer circumferential surface of the second inner disk and regulate movement of the second inner disk to a side of the valve chamber in the thickness direction by abutting on each other, wherein the second sealing portion is attached to the second annular surface with an adhesive.

6. The valve device according to claim 5, wherein the first sealing portion and the second sealing portion form protrusions projecting from the first annular surface and the second annular surface, respectively.

7. The valve device according to claim 5, wherein the first inner disk includes a third annular surface that is formed at the inner peripheral edge portion on a side facing the valve chamber, and the third annular surface is substantially flush with the first annular surface in a radial direction in a state in which the pair of regulating portions abut on each other.

8. The valve device according to claim 5, wherein the first inner disk includes a fourth annular surface that is formed at the inner peripheral edge portion on a side opposite to the first annular surface and faces the bottom surface of the recessed portion, and the second sealing portion projects toward the bottom surface of the recessed portion with a projection height that is greater than a height with which the second sealing portion is flush with the fourth annular surface in a radial direction in a state in which the pair of regulating portions abut on each other.

9. The valve device according to claim 5, wherein the first sealing portion and the second sealing portion are made of fluorine rubber.

10. The valve device according to claim 5, wherein the outer peripheral edge portion includes a projecting portion that projects toward the bottom surface of the recessed portion in a thickness direction of the inner disk.

11. The valve device according to claim 5, wherein the first sealing portion is attached to the first annular surface with an adhesive.

12. The valve device according to claim 5, wherein the second sealing portion is made of fluorine rubber, and wherein the second inner disk is made of a metallic material.

13. The valve device according to claim 5, wherein the first sealing portion configured as a valve seat body is uncoated.

* * * * *